Figure 2:
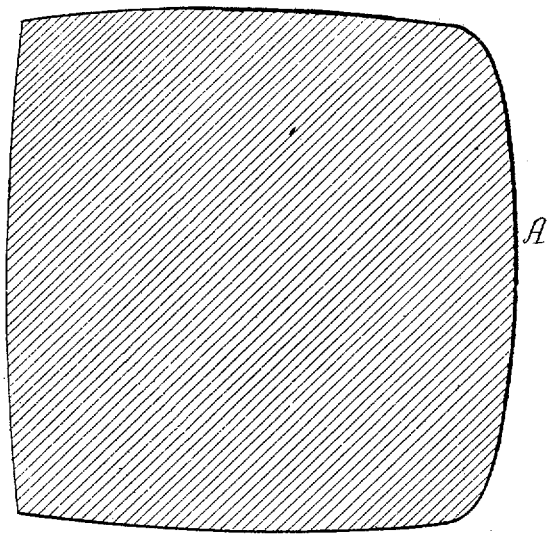

E. WARD.

Improvement in Manufacture of Winkers for Harness-Bridles.

No. 4,988. Reissued July 16, 1872.

Witnesses,
Phil. H. Sayner
Geo. F. Kenz.

Inventor,
Eugene Ward
By Wm. C. Wood
Attorney

AM. PHOTO-LITHOGRAPHIC CO. N.Y. (OSBORNES PROCESS.)

UNITED STATES PATENT OFFICE.

EUGENE WARD, OF NEWARK, NEW JERSEY, ASSIGNOR TO HIMSELF, FRANCIS C. BUTLER, AND ELIAS S. WARD.

IMPROVEMENT IN THE MANUFACTURE OF WINKERS FOR HARNESS-BRIDLES.

Specification forming part of Letters Patent No. 103,530, dated May 24, 1870; reissue No. 4,988, dated July 16, 1872.

*To all whom it may concern:*

Be it known that I, EUGENE WARD, of the city of Newark, in the county of Essex and State of New Jersey, have invented a certain new and useful Improvement in the Manufacture of Harness Blinds or Winkers.

My improvement relates to that class of blinds or winkers which are stiffened by means of a metallic plate interposed between the pieces of leather composing the front and back of the blind. My invention consists in simultaneously molding or shaping the flat metallic stiffener and the leather into the desired semi-concavo-convex form by means of dies and the application of pressure; and I do hereby declare that the following specification, taken in connection with the drawing furnished and forming a part of the same, is a true and clear description thereof.

Figure 1:
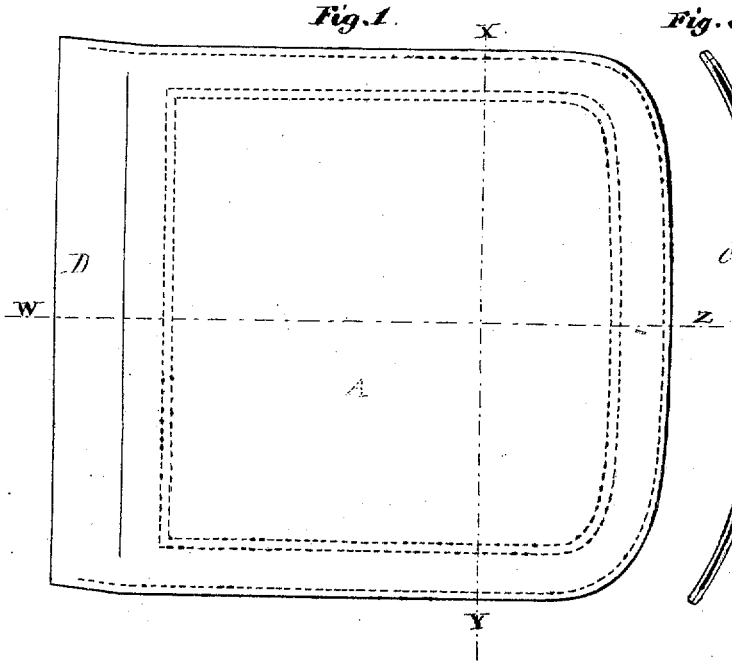
Figure 3:
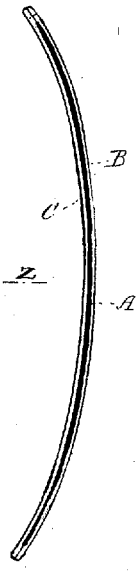
Figure 4:
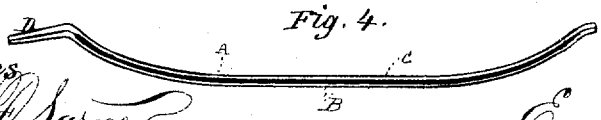

Referring to the drawing, Figure 1 represents a complete winker manufactured by my process. Fig. 2 represents the metallic stiffener. Fig. 3 represents, in section, the winker, Fig. 1, on line X Y. Fig. 4 represents same in section on line W Z.

A in the several figures denotes the metallic plate or stiffener. In outline it resembles the finished winker, having one straight end, one rounded end, two right-angled and two rounded corners, and is usually a piece of soft thin sheet-iron. B denotes the front leather or face of the winker. It is usually a piece of "patent" or enameled leather, and is intentionally more or less ornamented. C denotes the lining, which is usually a piece of plain leather secured to the front B at a short distance from the surrounding outer edge by a continuous line of stitching, which extends throughout the length of the top, front, and lower edges of the winker. D denotes the rear side of the blind, which is left unstitched and ready for attachment to the bridle-cheek, as is usual in harness-blinds.

In the manufacture of blinds by the practice in vogue prior to the date of my invention the metallic stiffener was separately molded or shaped into its semi-concavo convex form by compression in match-dies, in a manner well known to persons skilled in the art of working sheet metal. The leather front and back were joined together by the line of stitching already described, while flat, thus forming the bag-like receptacle for the already-formed stiffener, which, prior to insertion, was well covered with paste or mucilage. After having been inserted, (or sometimes before,) the leather was more or less moistened and then made to adhere to the stiffener, and correspond therewith on both sides, by means of a rubbing-tool applied by hand. Much time was required for so manipulating the leather as to secure a proper form and adherence to the plate, and also for thoroughly drying out the moisture which had been applied to the leather. More or less loss in labor frequently occurred during the drying operation, owing to the uneven shrinkage of the leather, necessitating the repetition of the labor with the hand-rubber, and sometimes resulting in the total loss of the leather.

By my improved method the metallic stiffener, while flat, is inserted into the bag-like receptacle, (with or without paste,) and the unfinished flat blind is then placed into or between dies substantially corresponding in form with the finished blind, and, by compression, the outer leather surface is made convex, the inner leather surface concave, and the metallic stiffener concavo-convex.

By my improved process the blind is more rapidly shaped than by hand, and is much neater.

Such blinds as are made by my improved process are more uniform than those made by hand, for the reason that the leather need not be moistened, and therefore no uneven shrinkage can occur, as is the case frequently during the process of drying, as heretofore manufactured. They are also more solid than those made by hand, for the leather is simultaneously molded or shaped with the metallic plate, and is therefore held or retained in the new position which it has been forced to assume.

Having thus described my invention, I claim as new, to be secured by Letters Patent—

The improved method of manufacturing harness-blinds herein described, which consists in simultaneously molding or shaping the flat stitched leather and the flat interposed metallic stiffener into the desired semi-concavo convex form by means of suitable dies and compression therein, as and for the purposes specified.

EUGENE WARD.

Witnesses:
F. A. JOHNSON,
LESLIE D. WARD.